United States Patent [19]

Abele et al.

[11] Patent Number: 5,214,100

[45] Date of Patent: May 25, 1993

[54] USE OF CERTAIN PHENOLIC RESINS FOR REINFORCING RUBBER VULCANIZATES

[75] Inventors: Manfred Abele, Cologne; Hans-Josef Buysch, Krefeld; Heinrich Schrage, Krefeld; Hugo Vernaleken, Krefeld, all of Fed. Rep. of Germany

[73] Assignee: Bayer Aktiengesellschaft, Leverkusen, Fed. Rep. of Germany

[21] Appl. No.: 655,717

[22] Filed: Feb. 15, 1991

[30] Foreign Application Priority Data

Feb. 27, 1990 [DE] Fed. Rep. of Germany ....... 4006131

[51] Int. Cl.$^5$ .............................................. C08L 27/04
[52] U.S. Cl. .................................. 525/151; 525/132; 525/152; 152/547
[58] Field of Search .................... 525/151, 152, 132; 152/547

[56] References Cited

U.S. PATENT DOCUMENTS

| 3,026,297 | 3/1962 | Spacht | 525/151 |
|---|---|---|---|
| 3,625,874 | 12/1971 | Cottman et al. | 260/5 |
| 3,644,537 | 2/1972 | Dannels et al. | 528/205 |
| 3,927,239 | 12/1975 | Gobran | 524/571 |
| 3,944,523 | 3/1976 | Gobran | 525/534 |
| 3,976,606 | 8/1976 | Gobran | 525/940 |
| 4,032,486 | 6/1977 | Gobran | 525/455 |
| 4,039,724 | 8/1977 | Gobran | 525/455 |
| 4,191,671 | 3/1980 | Kataoka et al. | 525/445 |
| 5,071,943 | 2/1991 | Abele et al. | 528/205 |

FOREIGN PATENT DOCUMENTS

| 0023256 | 2/1981 | European Pat. Off. |
| 945291 | 7/1956 | Fed. Rep. of Germany. |
| 1228421 | 1/1966 | Fed. Rep. of Germany. |
| 2248309 | 5/1975 | France. |

Primary Examiner—James J. Seidleck
Assistant Examiner—W. R. M. Clark
Attorney, Agent, or Firm—Connolly & Hutz

[57] ABSTRACT

Phenolic resins obtainable by Friedel-Crafts alkylation of phenols with polyfunctional compounds are eminently suitable as a reinforcing resin for rubber vulcanizates.

4 Claims, No Drawings

USE OF CERTAIN PHENOLIC RESINS FOR REINFORCING RUBBER VULCANIZATES

This invention relates to the use of externally cross-linkable novolak-like phenolic resins for reinforcing rubber vulcanisates. It may be assumed that, when phenolic resin and rubber are mixed, the phenolic resin is cured and the rubber vulcanized, crosslinked systems of the so-called interpenetrating network type are formed.

It is known that novolaks are fusible, non-self-curing polyphenols of which the aromatic nuclei are attached by alkylidene groups and which are soluble in a number of organic solvents. They may be produced from phenols and keto compounds in the presence of acidic catalysts, a molar ratio of keto compound to phenol of at most 1 and preferably of at most 0.75 normally being maintained: cf. "Methoden der Organischen Chemie" (Houben-Weyl), Vol. 14/2, Georg Thieme Verlag, Stuttgart 1963, pages 193 et sec.

In contrast to the self-curing resols, novolaks and also the "novolak-like phenolic resins" to be used in accordance with the invention are substantially free from groups capable of self-crosslinking, i.e. mainly hydroxymethyl groups.

"Novolaks" in the narrower sense are understood to be phenol/formaldehyde condensates while "novolaks" in the broader sense also include phenol condensates of other keto compounds (for example acetaldehyde, butyraldehyde, acetone, methyl ethyl ketone), the phenol rings being attached solely by substituted methylene groups as a result of alkylations which clearly take place during the synthesis.

By contrast, the present invention relates to the use of novolak-like phenolic resins of which the bridge members (measured over the shortest distance between two phenol rings) predominantly contain (i.e. to a level of more than 50 and preferably more than 80 mol-%) 2 to 8 optionally substituted carbon atoms.

It has surprisingly been found that novolak-like phenolic resins of the type in question are eminently suitable as reinforcing resins for rubber vulcanizates. In the manufacture of tires for example, parts which are intended to combine high strength with moderate elasticity, such as for example the base (bead), and which are made of rubber vulcanizates of the type in question show particularly favorable properties. The phenolic resins to be used in accordance with the invention are particularly suitable as a core filler (apex).

Accordingly, the present invention relates to the use of phenolic resins obtainable by Friedel-Crafts alkylation of A) at least one phenol with B) at least one compound containing 4 to 8 carbon atoms and 2 to 4 and preferably 3 or 4 functional groups from the series of chlorine atoms and C=C double bonds as a reinforcing resin for rubber vulcanizates.

Preferred phenols A for the process according to the invention include monohydric and dihydric mononuclear phenols which, apart from the phenolic hydroxyl groups, contain no other substituents, such as unsubstituted phenol itself, pyrocatechol, resorcinol, hydroquinone; monohydric $C_{1-6}$ alkylphenols, such as cresols, xylenols, ethylphenols, hexylphenols; monohydric phenylphenols, such as hydroxybiphenyls; mononuclear and binuclear $C_{6-18}$ bisphenols, such as dihydroxybiphenyls, bis-(4-hydroxyphenyl)-methane, 2,2-bis-(4-hydroxyphenyl)-propane and bis-(4-hydroxyphenyl)-sulfide.

In addition to chloroprene, unwanted secondary products containing 4 to 8, preferably 4 or 8, carbon atoms and at least 3, preferably at least 4, functional groups from the series consisting of chlorine atoms and C=C double bonds are formed during the production of chloroprene by chlorination of butadiene. Typical secondary products consist of mixtures of 20 to 60% by weight 1,2,3,4-tetrachlorobutane, 10 to 60% by weight dichlorooctadienes, 3 to 20% by weight trichlorobutenes, 2 to 8% by weight tetrachlorooctenes and up to 15% by weight dichlorobutenes, dichlorobutanes and hexachlorooctanes. The chlorine content of such mixtures is generally from 40 to 70% by weight and preferably from 45 to 60% by weight, based on the mixture. These mixtures of secondary products are eminently suitable as compounds B in the context of the present invention. The individual components, irrespective of their origin, and mixtures of these components and also mixtures of secondary products concentrated by distillation are of course also suitable for this purpose. Tetrachlorobutanes give phenolic resins having outstanding properties while dichlorooctadienes give phenolic resins having excellent properties, measured as the reinforcing effect in vulcanizates.

For the production of the phenolic resins to be used in accordance with the invention, the starting products are generally used in quantities corresponding to an equivalent ratio of phenolic OH of the phenols A to functional groups of the compounds B (chlorine or C=C double bond) of 1:10 to 10:1, preferably 1:4 to 8:1 and, more preferably, 1:2 to 5:1.

Suitable catalysts for the production of the phenolic resins to be used in accordance with the invention include any chemical compounds which accelerate Friedel-Crafts alkylations, i.e. protonic acids and Lewis acids such as, for example, sulfuric acid, hydrogen chloride, phosphoric acid, aluminium chloride, metallic iron and compounds of iron, preferably 2- and 3-valent iron, such as for example the bromides, nitrates, sulfates, oxalates, more particularly the chlorides, tin chloride, boron trifluoride, titanium tetrachloride, zinc chloride and zinc sulfate. Zinc salts are preferred; zinc sulfate is particularly preferred. The reaction may even be carried out in the absence of a catalyst because the hydrogen chloride formed during the reaction also has a catalytic effect.

In the case of salts, typical quantities of catalyst are generally from 0.05 to 10% by weight and preferably from 0.1 to 3% by weight. In the case of acids, typical quantities of catalyst are generally from 0.05 to 10% by weight and preferably from 0.1 to 5% by weight, based on compounds B.

The process for the production of the phenolic resins to be used in accordance with the invention is preferably carried out in the absence of solvents. However, organic solvents that are inert under the reaction conditions, preferably those having a boiling point above 120° C. and more particularly above 180° C., such as nitrobenzene, dichlorobenzenes, benzonitrile, chloronaphthalenes, may readily be used. If it is desired to carry out the process in solution, the organic solvent will be used in quantities of 5 to 100% by weight, based on the sum of phenols A and compounds B.

The process according to the invention is exothermic and, accordingly, proceeds on its own in the absence of heat applied from outside once it has been started. To obtain a substantially complete reaction and, hence, a minimal chlorine content in the end product, it may be advisable to leave the reaction mixture standing for 2 to 20 hours at temperatures of 40° to 280° C., preferably at temperatures of 80° to 250° C. and more preferably at temperatures of 120° to 200° C. after the components have been added. The reaction is over when the evolution of hydrogen chloride stops.

In practice, the process according to the invention may be carried out, for example, by initially introducing the molten phenol A and the catalyst and adding the mixture B, optionally dissolved in the organic solvent. To obtain thorough mixing of the components, the reaction mixture may be stirred. On completion of the reaction, solvent (where present) and excess phenol may be removed, preferably by distillation, optionally under reduced pressure. The distillate obtained may be reused for further reactions.

For example, the phenolic resins known from U.S. Pat. No. 3,644,537 may also be used in accordance with the invention although they do give products having poor hardness values.

The phenolic resins to be used in accordance with the invention contain 0.2 to 1 and preferably 0.4 to 0.8 mol units emanating from component B per mol unit emanating from phenol A.

The phenolic resins to be used in accordance with the invention generally have softening points (according to DIN 53 244) in the range from 50 to 200° C., OH values in the range from 100 to 550 and number average molecular weights $M_n$ in the range from 250 to 2000 (as determined by vapor pressure osmometry in methanol and acetone, the lower value being regarded as the correct value).

According to the invention, the described phenolic resins are suitable as reinforcing resins for rubber vulcanizates. These vulcanizates may be based on natural and synthetic rubbers.

Preferred synthetic rubbers are described, for example, in W. Hoffmann, Kautschuk-Technologie, Gentner Verlag, Stuttgart 1980, and include inter alia BR—polybutadiene
ABR—butadiene/$C_{1-4}$ alkyl acrylate copolymers having acrylate contents of 5 to 60 and preferably 15 to 50% by weight
CR—polychloroprene
IR—polyisoprene
IIR—isobutylene/isoprene copolymers
SBR—styrene/butadiene copolymers having styrene contents of 1 to 60 and preferably 20 to 50% by weight
NBR—butadiene acrylonitrile copolymers having acrylonitrile contents of 5 to 60 and preferably 10 to 50% by weight
EPDM—ethylene/propylene/diene copolymers
and mixtures of these rubbers.

Since the phenolic resins to be used in accordance with the invention are particularly suitable as reinforcing resins which may be used in tire manufacture, natural rubber and styrene/butadiene copolymers and mixtures thereof are particularly preferred rubbers.

Rubbers have glass transition temperatures below 20° C. and preferably below 0° C., as determined by the torsion pendulum test according to DIN 53 445. The dosage of the phenolic resins may be from 1 to 50 and preferably from 3 to 15% by weight, based on rubber.

Since the phenolic resins to be used in accordance with the invention are not self-curing, they require the addition of formaldehyde, formaldehyde donors, such as hexamethylene tetramine, or melamine or urea condensates containing methylol groups for curing, in the same way as novolaks. These curing agents are generally used in quantities of from 2.5 to 50% by weight and preferably in quantities of 5 to 15% by weight, based on phenolic resin. If the phenolic resins are cured and the rubber surrounding them is vulcanized, it may be assumed that crosslinked systems of the so-called interpenetrating network type are formed. In that case, it may be assumed that the phenolic resin to be used in accordance with the invention is not part of the vulcanizing system required for the rubber.

The vulcanization may take place in the presence of typical vulcanizing agents such as, for example, elemental sulfur, sulfur donors, ethylene thiourea, cyclic thiuram disulfides, peroxides, crosslinking resins, quinone derivatives, diisocyanates, dithionites, bifunctional Bunte salts, diazo compounds, dinitroso compounds, nitrenes, dithiols, bis-nitrile imines, bis-hydrosilanes.

In addition to the vulcanizing agents, vulcanization accelerators, for example thiuram derivatives, guanidine, mercapto and sulfenamide accelerators (thiazole derivatives), are normally used along with activators, such as zinc oxide, magnesium oxide, calcium oxide, and fatty acids, for example stearic acid.

Fillers may also be used in the normal way. The most preferred filler is carbon black. Plasticizers, such as mineral oil for example, may also be used. The type and quantity of fillers and plasticizers are selected so that the hardness of the vulcanizates and the other desired properties, for example abrasion, skid resistance and hysteresis, satisfy practical requirements.

Stabilizers against thermal and oxidative damage can protect the vulcanizates against ageing. Preferred stabilizers are sterically hindered phenol derivatives and derivatives of phenylenediamine and also condensation products of anilines and ketones.

The use according to the invention leads to improvements in certain important mechanical properties of the vulcanizates, including for example hardness and modulus values. The reinforcing resins may be incorporated by means of the units typically used for the production of rubber mixtures, including for example internal mixers and mixing rolls. At high mixing temperatures (internal mixer), the reinforcing resin and the curing component should be separately incorporated to avoid premature reactions and to obtain high vulcanizate hardness. It is advisable in this regard to incorporate the curing component at a low mixing temperature (max. approx. 100° C.) towards the end of the preparation of the mixture.

Vulcanization may take place at temperatures of 100° to 200° C. and preferably at temperatures of 130° to 180° C., optionally under a pressure of 10 to 200 bar.

In the following Examples, percentages and parts are by weight.

EXAMPLES

The "product mixture" referred to in Example 1 is understood to be a mixture of secondary products obtained in the chlorination of butadiene with a chlorine content of 54% and a C═C double bond content of 0.575 mol double bonds per 100 g product. 35% of the product mixture consisted of tetrachlorobutane, 40% of dichlorooctadienes, 7% of trichlorobutenes, 8% of tetrachlorooctenes and 10% of other products in relatively small amounts.

EXAMPLE 1

200 g product mixture were added dropwise at 60° C. to a melt of 400 g phenol and 4 g anhydrous iron chloride, the reaction mixture undergoing a spontaneous increase in temperature to approximately 80° C. The reaction mixture was then heated for 6 hours at 182° C. and the excess phenol was distilled off. 250 g phenolic resin softening at 105° C., OH value 240, were left as residue.

EXAMPLE 2

200 g of an isomer mixture (chlorine content: 39.7%; double bond content: 1.10 mol per 100 g) of dichlorooctadienes, which was distilled out from the secondary products ("product mixture") formed in the chlorination of butadiene (contained approx. 90% dichlorooctadienes), were added dropwise at 60° C. to a melt of 200 g phenol and 4 g anhydrous zinc chloride, the reaction mixture undergoing a spontaneous increase in temperature to approximately 90° C. The reaction mixture was then heated for 4 hours at 182° C. and the excess phenol was distilled off. 204 g phenolic resin softening at 90° C., OH value 224, were left as residue.

EXAMPLE 3

200 g of an isomer mixture of 1,2,3,4-tetrachlorobutane (contained approx. 50% meso- and approx. 50% d,1-tetrachlorobutane) were added dropwise at 60° C. to a melt of 400 g phenol and 4 g anhydrous iron chloride. The reaction mixture was then heated for 6 hours at 182° C. and the excess phenol was distilled off. 255 g phenolic resin softening at 90° C., OH value 295, were left as residue.

APPLICATION

The object of the following tests is to illustrate the use of the phenolic resins to be used in accordance with the invention as reinforcing resins for rubber compounds and vulcanizates thereof.

The following test mixture produced in two stages was used for this purpose. The first phase of the production process was carried out in an internal mixer (kneader). The following constituents were mixed (in parts):

| | |
|---|---|
| Natural rubber (type SMR 5) | 75.0 |
| Polybutadiene | 25.0 |
| Stearic acid | 2.0 |
| Zinc oxide | 5.0 |
| Reinforcing resin (cf. Table) | 7.5 |
| Carbon black N 326 | 70.0 |
| N-Isopropyl-N'-phenyl-p-phenylenediamine (IPPD) | 1.5 |
| 2,2,4-Trimethyl-1,2-dihydroquinoline, polymerized (TMQ) | 1.0 |
| | 187.0 |

After a mixing time of 5 minutes, the internal kneader was emptied and the mixture thus prepared was mixed to completion on following mixing rolls in accordance with the following formulation (in parts):

| | |
|---|---|
| Preliminary mixture | 187.0 |
| Sulfur | 2.5 |
| Benzothiazyl-2-sulfene morpholide | 1.5 |
| N-cyclohexylthiophthalimide | 0.3 |
| Hexamethylene tetramine | 0.76 |

The final mixtures were vulcanized for 30 minutes at 150° C.

The results of the vulcanizate tests are shown in the following Table. The results of the vulcanizate tests show that the resins to be used in accordance with the invention have an excellent reinforcing effect.

| | Vulcanizates Reinforced with Various Resins | | | | |
|---|---|---|---|---|---|
| Tests | Comparison 1 Vulcanizate free from reinforcing resin | Comparison 2 Commercially available novolak* | Resin of Example 1 | 2 | 3 |
| Tensile strength (MPa) | 19.4 | 16.2 | 16.5 | 16.2 | 14.6 |
| Elongation at break (%) | 332 | 300 | 370 | 366 | 347 |
| Modulus at at 100% elongation (MPa) | 4.4 | 5.7 | 5.2 | 5.3 | 4.8 |
| Hardness (Shore A) | | | | | |
| at 23° C. | 77 | 90 | 90 | 91 | 90 |
| at 70° C. | 72 | 87 | 87 | 89 | 86 |
| Rebound resilience (%) determined | | | | | |
| at 23° C. | 43 | 40 | 40 | 38 | 39 |
| at 70° C. | 53 | 46 | 43 | 42 | 44 |

*) Phenol-formaldehyde condensate, (R)Vulkadur RB, a product of Bayer AG

We claim:

1. Rubber vulcanizates containing a reinforcing resin which is a phenolic resin obtained by a Friedel-Crafts alkylation of at least one phenol and at least one compound containing 4 to 8 carbon atoms and 2 to 4 functional groups comprising chlorine atoms.

2. Rubber vulcanizates claimed in claim 1 wherein the reinforcing resin is 1 to 50% by weight of the vulcanizate.

3. Rubber vulcanizates claimed in claim 1 wherein the reinforcing resin is 3 to 15% by weight of the vulcanizate.

4. In a pneumatic vehicle tire having a bead, the improvement comprises said bead containing the rubber vulcanizate claimed in claim 1.

* * * * *